(12) United States Patent
Tokioka et al.

(10) Patent No.: US 12,286,147 B2
(45) Date of Patent: Apr. 29, 2025

(54) STEERING DEVICE

(71) Applicant: JTEKT CORPORATION, Kariya (JP)

(72) Inventors: Ryoichi Tokioka, Kashiba (JP);
Yasuyuki Nozawa, Kashihara (JP);
Ryosuke Yamaguchi, Kariya (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/727,243

(22) PCT Filed: Feb. 2, 2022

(86) PCT No.: PCT/JP2022/004098
§ 371 (c)(1),
(2) Date: Jul. 8, 2024

(87) PCT Pub. No.: WO2023/148855
PCT Pub. Date: Aug. 10, 2023

(65) Prior Publication Data
US 2025/0091635 A1    Mar. 20, 2025

(51) Int. Cl.
*B62D 1/183* (2006.01)
*B62D 1/185* (2006.01)
*F16C 29/04* (2006.01)

(52) U.S. Cl.
CPC .............. *B62D 1/183* (2013.01); *B62D 1/185* (2013.01); *F16C 29/045* (2013.01)

(58) Field of Classification Search
CPC . B62D 1/00; B62D 1/18; B62D 1/183; B62D 1/19; B62D 5/001; B62D 5/00
See application file for complete search history.

(56) References Cited

U.S. PATENT DOCUMENTS 3,977,692 A * 8/1976 Findley ................. B62D 1/184
74/567
2004/0000781 A1    1/2004 Lange et al.
(Continued)

FOREIGN PATENT DOCUMENTS

EP          1721806 A2 * 11/2006 ............ B62D 1/184
JP       2020-185851 A    11/2020
(Continued)

OTHER PUBLICATIONS

Du, WO-2019193956-A1, Machine Translation of Specification (Year: 2019).*
(Continued)

*Primary Examiner* — Drew J Brown
*Assistant Examiner* — Matthew Joseph Ganci
(74) *Attorney, Agent, or Firm* — Oliff PLC

(57) ABSTRACT

A steering device that holds a steering member in such a manner that the steering member is movable between an advanced position where a driver can steer the steering member and a retracted position located closer to the front of a vehicle. The steering device includes: a fixed member attached to a vehicle body; a movable member to which a steering shaft holding the steering member is rotatably attached; and an upper guide mechanism and a lower guide mechanism that linearly guide the movable member with respect to the fixed member. An end on the advancing side of the upper guide mechanism is located further toward the advancing side than an end on the advancing side of the lower guide mechanism in an advancing and retracting direction of the movable member.

4 Claims, 4 Drawing Sheets

(56) References Cited

U.S. PATENT DOCUMENTS

2018/0370559 A1    12/2018  Swamidason
2021/0016820 A1    1/2021  Nozawa et al.
2021/0031822 A1*  2/2021  Watanabe .............. B62D 1/181

FOREIGN PATENT DOCUMENTS

| JP | 2021-020583 A | | 2/2021 | |
|---|---|---|---|---|
| JP | 2021-046001 A | | 3/2021 | |
| KR | 20180088252 A | * | 8/2018 | |
| KR | 20220001565 A | * | 1/2022 | |
| WO | 2019/005736 A1 | | 1/2019 | |
| WO | WO-2019193956 A1 | * | 10/2019 | .............. B62D 1/04 |

OTHER PUBLICATIONS

Bi, KR-20180088252-A, Machine Translation of Specification (Year: 2018).*

Jong, KR-20220001565-A, Machine Translation of Specification (Year: 2022).*

Dieterle, EP-1721806-A2, Machine Translation of Specification (Year: 2006).*

Mar. 29, 2022 International Search Report issued in International Patent Application No. PCT/JP2022/004098.

Mar. 4, 2025 Extended Search Report issued in European Patent Application No. 22924595.6.

* cited by examiner

STEERING DEVICE

TECHNICAL FIELD

The present invention relates to steering devices holding a steering member that is steered by a driver in a vehicle etc.

BACKGROUND ART

Retractable steering devices are known that retract a steering member, a member that is steered by a driver, toward the front of a vehicle to improve driver's comfort in the vehicle during autonomous driving, and that advance the steering member to a position where the driver can operate the steering member when performing manual driving (see, for example, Patent Document 1 and Patent Document 2).

RELATED ART DOCUMENTS

Patent Documents

Patent Document 1: WO2019/193956
Patent Document 2: WO2019/005736

SUMMARY OF THE INVENTION

Problem to be Solved by the Invention

In the case of such retractable steering devices, drivers usually get in and out of their vehicles with the steering member retracted to get out of the way. However, the inventors found that drivers sometimes keep the steering member advanced to use it to support themselves when getting in and out of their vehicles or adjusting their seating position. As a result of further experiments and research, the inventors found that a mechanism that guides the advancing and retracting movement of the steering device is subjected to a large load due to the downward force applied by a driver to the steering member.

The present invention was made based on the above findings of the inventors, and an object of the present invention is to provide a steering device that holds a steering member in such a manner that the steering member can be advanced and retracted, and that has strength and rigidity enough to resist a downward force applied by a driver to the steering member in an advanced state.

Means for Solving the Problem

In order to achieve the above object, a steering device that is one of the inventions is a steering device that holds a steering member in such a manner that the steering member is movable between an advanced position where a driver is able to steer the steering member and a retracted position located closer to a front of a vehicle. The steering device includes: a fixed member attached to a vehicle body; a movable member to which a steering shaft holding the steering member is rotatably attached; and an upper guide mechanism and a lower guide mechanism that linearly guide the movable member with respect to the fixed member. An end on an advancing side of the upper guide mechanism is located further toward an advancing side than an end on an advancing side of the lower guide mechanism in an advancing and retracting direction of the movable member.

Effects of the Invention

The present invention can provide a steering device having strength and rigidity improved enough to resist a downward force applied by a driver to a steering member in an advanced state.

MODES FOR CARRYING OUT THE INVENTION

Figure 1:
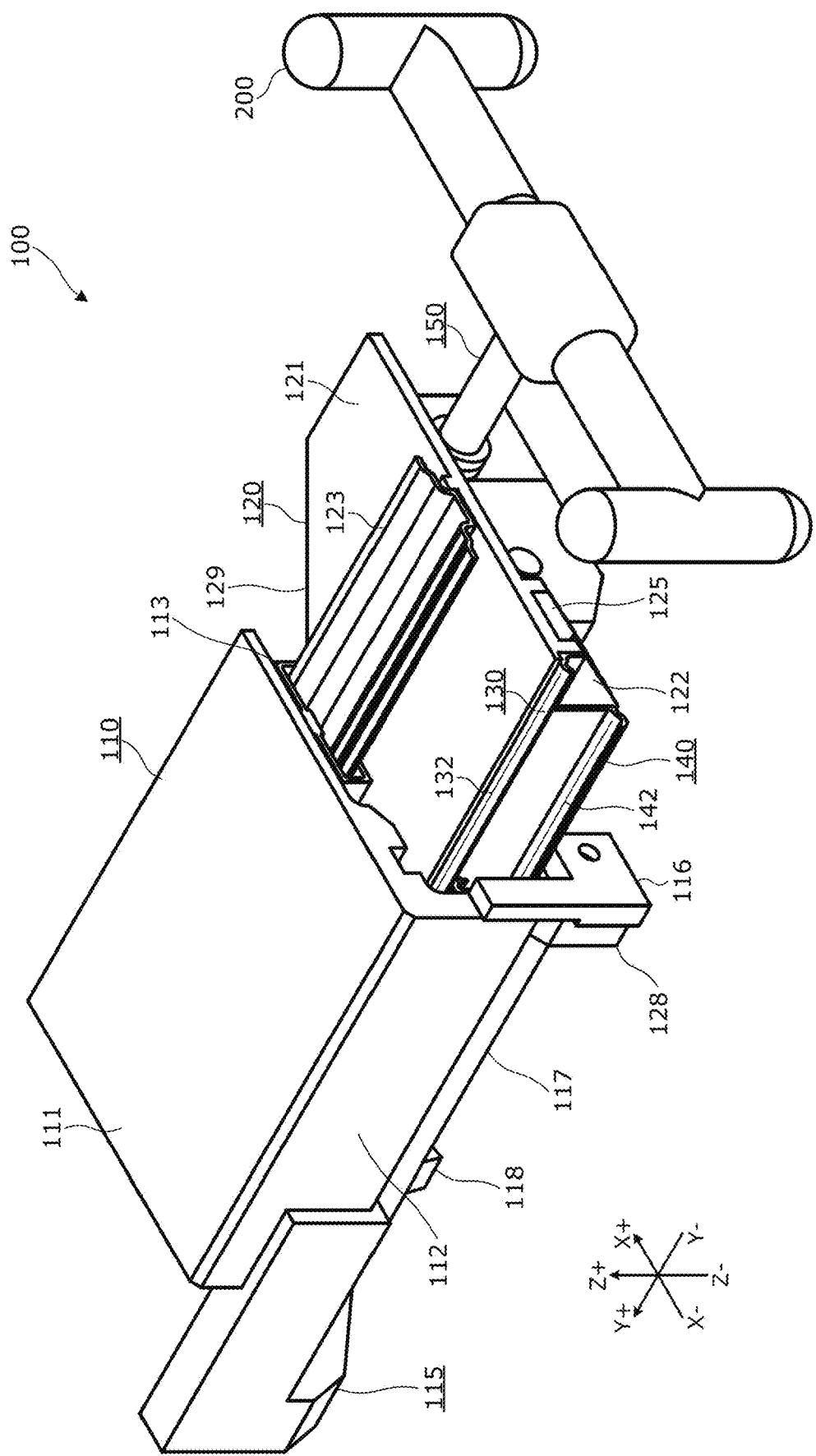
FIG. 1 is a perspective view of a steering device holding a steering member.

An embodiment of a steering device according to the present invention will be described below with reference to the drawings. The following embodiment shows an example in order to describe the present invention, and is not intended to limit the present invention. For example, the shapes, structures, materials, components, relative positional relationships, connection states, numerical values, mathematical expressions, and the content, order, etc. of steps of each method shown in the following embodiment are merely by way of example, and the present invention may include the content that is not described below. Although geometric terms such as parallel and perpendicular are sometimes used, these terms are not used in a mathematically strict sense, and may include substantially allowable variations, deviations, etc. Terms such as simultaneously and same also include substantially allowable margins.

The drawings are schematic illustrations with exaggerations, omissions, or adjustments of proportions being made as appropriate in order to describe the present invention, and the shapes, positional relationships, and proportions shown in the drawings are different from actual shapes, positional relationships, and proportions. The X-axis, Y-axis, and Z-axis that are shown in some of the drawings indicate rectangular coordinates that are set as desired in order to describe the drawings. In other words, the Z-axis is not necessarily an axis in the vertical direction, and the X-axis and Y-axis are not necessarily present in a horizontal plane.

A plurality of inventions may be comprehensively described as one embodiment below. Some of the content described below is described as optional components related to the present invention.

FIG. 1 is a perspective view of a steering device holding a steering member. A steering device 100 is a steering device 100 that holds a steering member 200 in such a manner that the steering member 200 is movable between an advanced position that is a position where a driver can steer the steering member 200 and a retracted position located closer to the front of a vehicle. The steering device 100 includes a fixed member 110, a movable member 120, an upper guide mechanism 130, and a lower guide mechanism 140.

The fixed member 110 is a member that is fixedly attached to a reinforcement that is one of structural members of a vehicle body, etc. The manner in which the fixed member 110 is attached to the vehicle body is not limited, but in the present embodiment, the fixed member 110 is attached in a suspended state to a reinforcement extending in the width direction of the vehicle body. The sectional shape of the fixed member 110 perpendicular to the direction of movement of the movable member 120 (Y-axis direction in the figure) is an L-shape rotated 90 degrees to the right. The fixed member 110 includes a fixed top plate portion 111 in the form of a plate and a fixed wall portion 112 extending downward from one side (X− side in the figure) in the width direction (X-axis direction in the figure) of the fixed top plate portion 111.

A moving device 115 for moving the movable member 120 is attached to the lower part (Z− side in the figure) of the fixed member 110. The type of moving device 115 is not particularly limited, but in the present embodiment, the moving device 115 includes: a lead screw 117 that is fixedly attached to the movable member 120 via a fixing bracket 116 so as to extend in the direction of movement of the movable member 120 (Y-axis direction in the figure); a movable nut 128 that engages with the lead screw 117 and reciprocates in the direction of movement of the movable member 120 with rotation of the lead screw 117; and a rotational drive device 118 including a motor for rotating the lead screw 117.

The movable member 120 is a member that is attached such that it can reciprocate between the advanced position and the retracted position with respect to the fixed member 110 via the upper guide mechanism 130, the lower guide mechanism 140, and the moving device 115. A steering shaft 150 holding the steering member 200 is rotatably attached to the movable member 120. The sectional shape of the movable member 120 perpendicular to the direction of movement of the movable member 120 (Y-axis direction in the figure) is an L-shape rotated 90 degrees to the right. The movable member 120 includes a movable top plate portion 121 in the form of a plate and a movable wall portion 122 extending downward from one side (X− side in the figure) in the width direction (X-axis direction in the figure) of the movable top plate portion 121. The movable wall portion 122 is thicker than the fixed wall portion 112 in the width direction, and has a through hole 125 for passing a harness that is connected to an operation switch etc.

The movable top plate portion 121 has a cut portion 129 at the vehicle front side (Y+ side in the figure) of the steering shaft 150. Providing the cut portion 129 in the movable top plate portion 121 can avoid the movable member 120 interfering with part of a brake mechanism, air conditioner, tire housing, etc., when located in the retracted position, and allows the retracted position to be located closer to the front of the vehicle.

The end on the advancing side (Y− side in the figure) of the movable top plate portion 121 that is an upper part of the movable member 120 to which the upper guide mechanism 130 is attached is located further toward the advancing side than the end on the advancing side of a lower part of the movable wall portion 122 that is a lower part of the movable member 120 to which the lower guide mechanism 140 is attached. In the present embodiment, the end on the advancing side of the movable wall portion 122 is tilted so as to be located further toward the advancing side as it gets closer to its upper side. The upper part of the end on the advancing side of the movable wall portion 122 is thus located further toward the advancing side than the lower part thereof.

Figure 2:
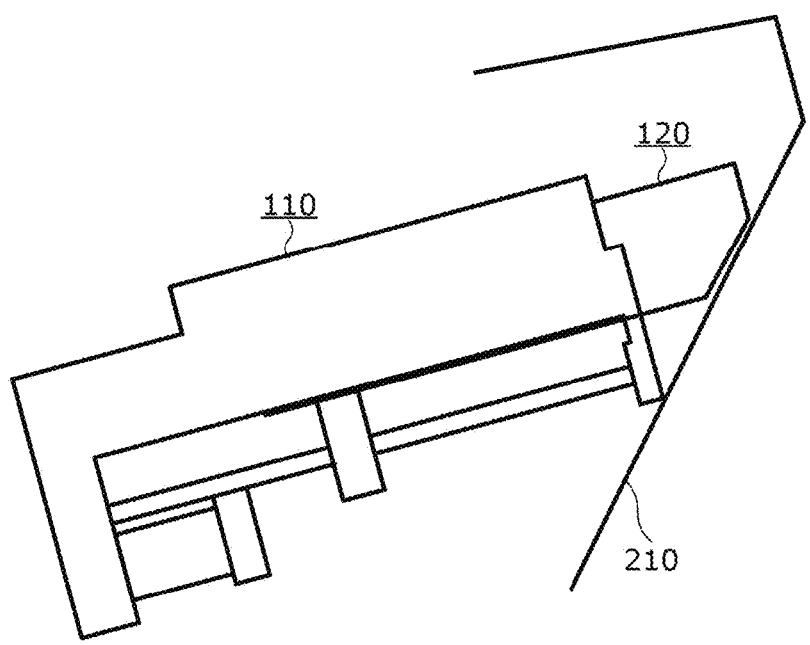
FIG. 2 is a side view of the steering device in a retracted state.
Figure 3:
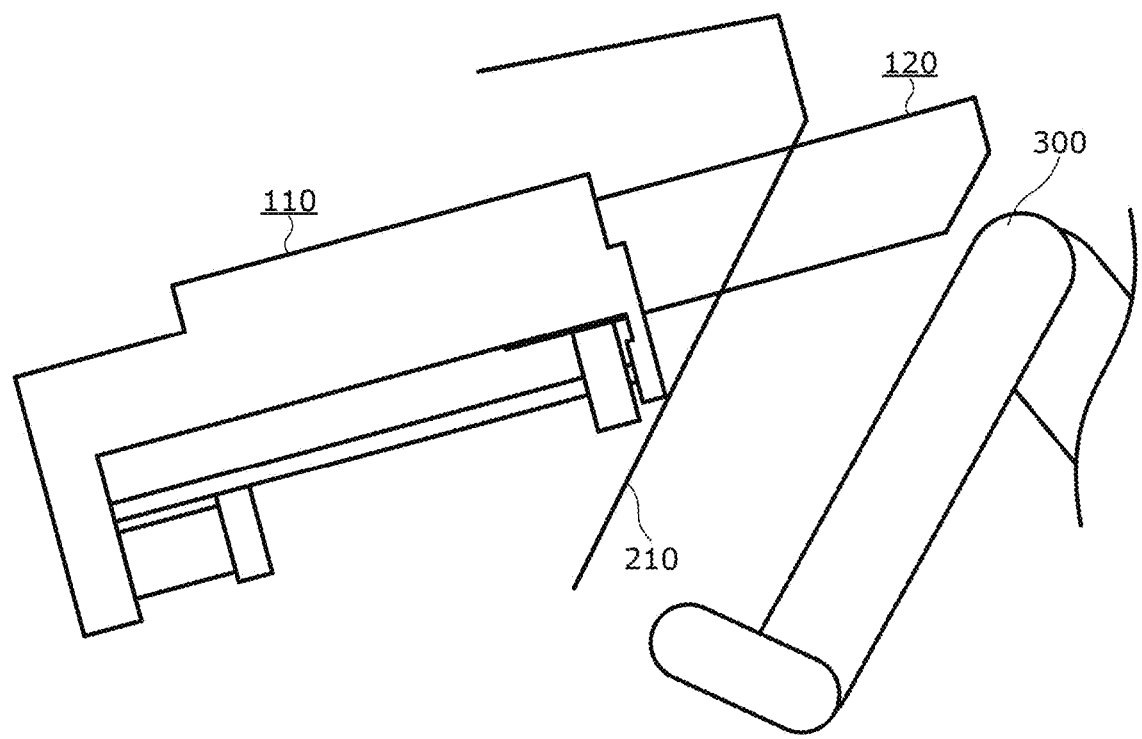
FIG. 3 is a side view of the steering device in an advanced state and a driver's leg.

Cutting the lower side of the movable wall portion 122 of the movable member 120 in this manner allows the movable member 120 to be stored inside a vehicle member 210 such as an instrument panel without sticking out when the movable member 120 is in the retracted position, as shown in FIG. 2. The length of the upper side of the movable wall portion 122 of the movable member 120 can be increased according to the slope of the vehicle member 210. This allows the upper guide mechanism 130, which will be described later, to be located further toward the advancing side than the lower guide mechanism 140. As shown in FIG. 3, this can also avoid a knee 300 of the driver hitting the sticking out movable member 120 even if the knee 300 moves toward the front of the vehicle in the event of a collision of the vehicle when the movable member 120 is in the advanced position.

Figure 4:
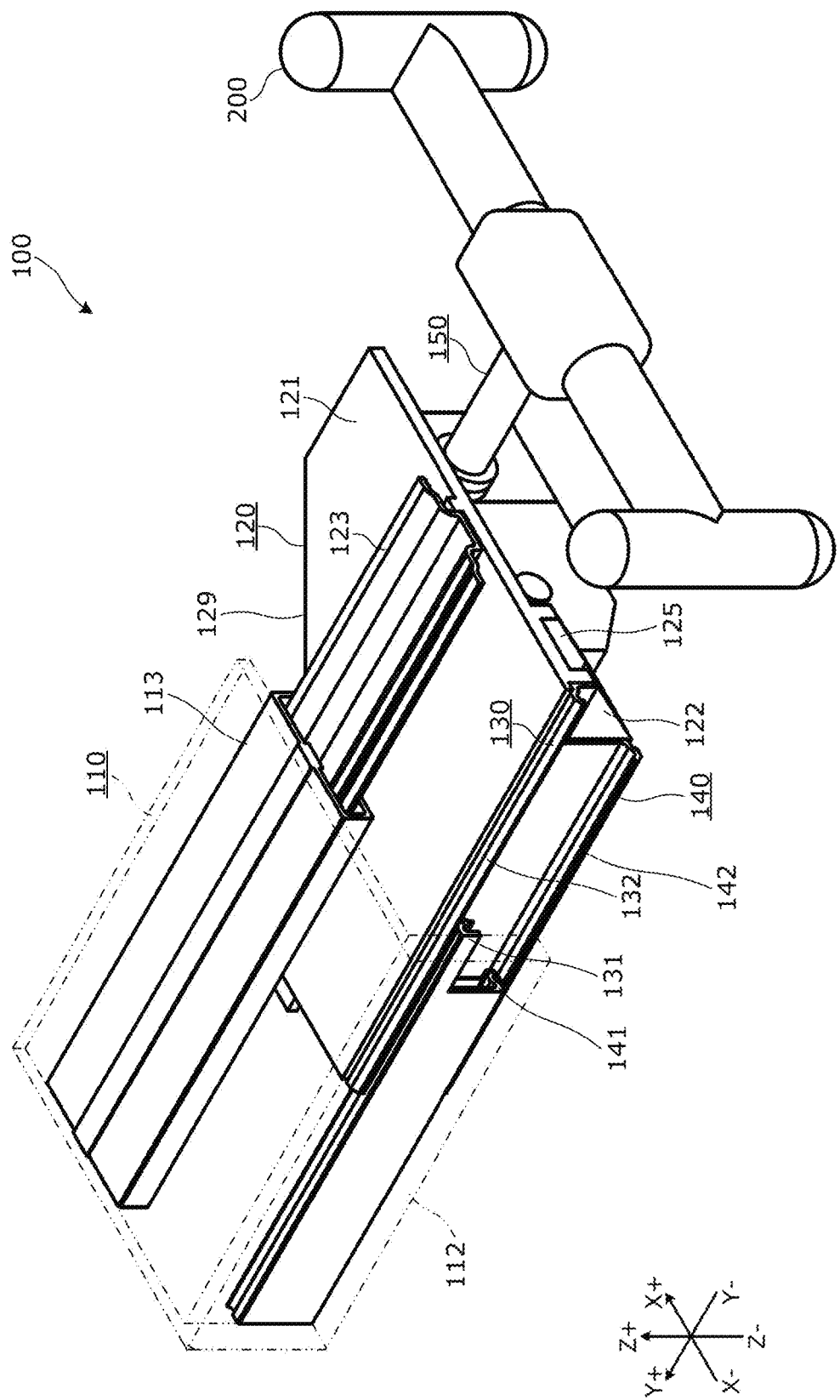
FIG. 4 is a perspective view of the steering device with a fixed member shown in phantom.
Figure 5:
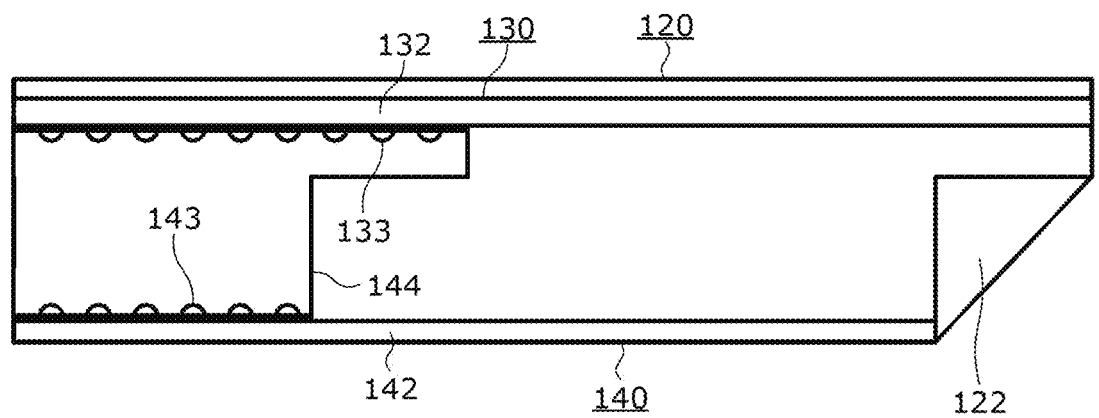
FIG. 5 is a side view showing a movable guide portion, rolling elements, and a cage together with a movable member.

FIG. 4 is a perspective view of the steering device 100 with the fixed member shown in phantom. The upper guide mechanism 130 is a mechanism that linearly guides the movable member 120 in the advancing and retracting direction with respect to the fixed member 110. In the present embodiment, the upper guide mechanism 130 includes an upper fixed guide portion 131 fixed to the inner side of the fixed wall portion 112 of the fixed member 110, and an upper movable guide portion 132 fixed to the outer side of the movable wall portion 122 of the movable member 120. The upper movable guide portion 132 may be configured to slide on the upper fixed guide portion 131, but in the present embodiment, upper rolling elements 133 that are rollably held are disposed between the upper fixed guide portion 131 and the upper movable guide portion 132, as shown in FIG. 5.

The upper fixed guide portion 131 is fixedly attached to the inner side (X+ side in the figure) in the width direction of the fixed wall portion 112 so as to extend in the direction of movement of the movable member 120. In the present embodiment, a first rail 113 having the same function as the upper fixed guide portion 131 is also fixedly attached to the lower surface (Z− side in the figure) of the fixed top plate portion 111 so as to extend in the direction of movement of the movable member 120. The end on the advancing side of the upper fixed guide portion 131 is located at the same position in the advancing and retracting direction of the movable member 120 as the end on the advancing side of the first rail 113.

The upper movable guide portion 132 is fixedly attached to the outer side (X− side in the figure) in the width direction of the movable wall portion 122 so as to extend in the direction of movement of the movable member 120. In the present embodiment, a second rail 123 having the same function as the upper movable guide portion 132 is also fixedly attached to the upper surface (Z+ side in the figure) of the movable top plate portion 121 so as to extend in the direction of movement of the movable member 120. The end on the advancing side of the upper movable guide portion 132 is located at the same position in the advancing and retracting direction of the movable member 120 as the end on the advancing side of the second rail. As with the upper guide mechanism 130 of the present embodiment, the first rail 113 and the second rail 123 are connected in a linearly movable manner via two rows of balls held by a retainer.

The lower guide mechanism 140 is a mechanism that is disposed below (on the Z− side in the figure) the upper guide mechanism 130 so as to be parallel to the upper guide mechanism 130 and that linearly guides the movable member 120 with respect to the fixed member 110 in the advancing and retracting direction. In the present embodiment, the lower guide mechanism 140 includes a lower fixed guide portion 141 fixed to the inner side of the fixed wall portion 112 of the fixed member 110, and a lower movable guide portion 142 fixed to the outer side of the movable wall portion 122 of the movable member 120. The lower movable guide portion 142 may be configured to slide on the lower fixed guide portion 141, but in the present embodiment, lower rolling elements 143 that are rollably held so as to maintain their predetermined intervals are disposed between the lower fixed guide portion 141 and the lower movable guide portion 142, as shown in FIG. 5.

The lower fixed guide portion 141 is disposed parallel to the upper fixed guide portion 131, and is fixedly attached to the inner side (X+ side in the figure) in the width direction of the fixed wall portion 112 so as to extend in the direction of movement of the movable member 120. The lower movable guide portion 142 is disposed parallel to the upper movable guide portion 132, and is fixedly attached to the outer side (X− side in the figure) in the width direction of the movable wall portion 122 so as to extend in the direction of movement of the movable member 120.

The upper fixed guide portion 131 and the lower fixed guide portion 141 are attached to the fixed member 110 such that the end on the advancing side of the upper fixed guide portion 131 is located further toward the advancing side than the end on the advancing side of the lower fixed guide portion 141 in the advancing and retracting direction of the movable member 120. The upper movable guide portion 132 and the lower movable guide portion 142 are attached to the movable member 120 such that the end on the advancing side of the upper movable guide portion 132 is located further toward the advancing side than the end on the advancing side of the lower movable guide portion 142. The length of the upper movable guide portion 132 is greater than the length of the lower movable guide portion. The number of upper rolling elements 133 is greater than the number of lower rolling elements 143.

In the present embodiment, the upper fixed guide portion 131 and the lower fixed guide portion 141 are formed as a single piece by bending a metal plate. The upper movable guide portion 132 and the lower movable guide portion 142 are formed as a single piece by bending a metal plate. The upper rolling elements 133 and the lower rolling elements 143 are rollably held by a single cage 144 having a trapezoidal shape whose upper base is longer than its lower base.

The steering shaft 150 is a member that is attached to the movable member 120 and rotatably holds the steering member 200. The shape of the steering shaft 150 is not particularly limited, and may be, for example, a cylinder or a hexagonal prism. The sectional shape or sectional area of the steering shaft 150 may change in the axial direction. In the present embodiment, the steering shaft 150 is attached to the movable member 120 so as to be rotatable about its own axis.

A sensor such as a steering angle sensor is attached to the end on the driver side (Y− side in the figure) of the steering shaft 150. In the case of the steer-by-wire steering device 100, the rotation angle of the steering shaft 150, that is, the steering angle of the steering member 200, is detected by the steering angle sensor (not shown), and steered wheels are steered based on a signal from the steering angle sensor.

Figure 6:
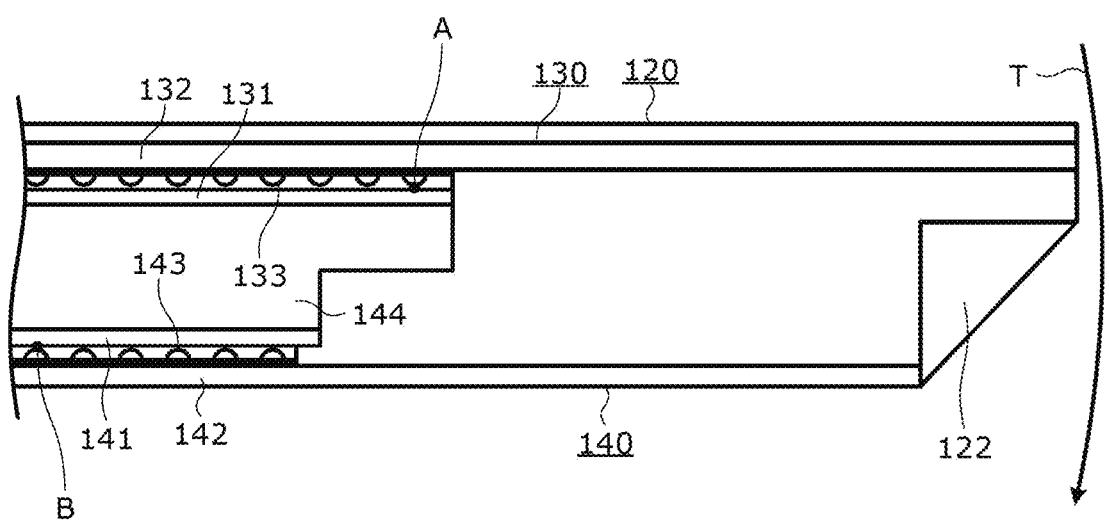
FIG. 6 is a side view showing a state in which torque is generated.

According to the steering device 100 of the embodiment, the end on the advancing side of the upper guide mechanism 130 is located further toward the advancing side than the end on the advancing side of the lower guide mechanism 140. Therefore, as shown in FIG. 6, torque T generated when the driver applies a downward force to the steering member 200 in the advanced position can be supported at least two positions (e.g., between a point A and a point B) that are separated by a distance greater than the length of arrangement of the plurality of lower rolling elements 143 arranged in a row. This can improve the structural strength of the steering device 100 and can give the driver holding the steering member 200 a feeling of stability and security.

Since the number of upper rolling elements 133 is greater than the number of lower rolling elements 143, that is, since the length of contact between the upper fixed guide portion 131 and the upper movable guide portion 132 (via the rolling elements) is greater than the length of contact between the lower fixed guide portion 141 and the lower movable guide portion 142 (via the rolling elements), the torque generated when the driver applies a downward force to the steering member 200 in the advanced position can be effectively supported. This can further improve the structural strength of the steering device 100.

The present invention is not limited to the above embodiment. For example, the present invention may include other embodiments that are implemented by combining the components described in this specification as desired or omitting some of the components. The present invention also includes modifications obtained by making various changes that occur to those skilled in the art to the above embodiment without departing from the spirit and scope of the present invention, that is, from the meaning of the terms in the claims.

For example, the steering device 100 may include a tilt mechanism that tilts the direction of movement of the movable member 120. In this case, the fixed member 110 may be swingably attached to the vehicle body, and the movable member 120 may be swingably attached to the fixed member 110.

Although the guide mechanism composed of the first rail 113 and the second rail 123 that are disposed between the fixed top plate portion 111 and the movable top plate portion 121 is described above, another upper guide mechanism 130 and another lower guide mechanism 140 may be provided on the opposite side of the steering shaft 150 from the upper guide mechanism 130 and the lower guide mechanism 140 in the width direction (X-axis direction in the figure).

INDUSTRIAL APPLICABILITY

The present invention can be used in steering systems for steering a vehicle such as a motor vehicle, a bus, or a truck, linkless steering systems, etc.

DESCRIPTION OF THE REFERENCE NUMERALS

100 . . . steering device, 110 . . . fixed member, 111 . . . fixed top plate portion, 112 . . . fixed wall portion, 113 . . . first rail, 115 . . . moving device, 116 . . . fixing bracket, 117 . . . screw, 118 . . . rotational drive device, 120 . . . movable member, 121 . . . movable top plate portion, 122 . . . movable wall portion, 123 . . . second rail, 125 . . . through hole, 128 . . . movable nut, 129 . . . portion, 130 . . . upper guide mechanism, 131 . . . upper fixed guide portion, 132 . . . upper movable guide portion, 133 . . . upper rolling element, 140 . . . lower guide mechanism, 141 . . . lower fixed guide portion, 142 . . . lower movable guide portion, 143 . . . lower rolling element, 144 . . . cage, 150 . . . steering shaft, 200 . . . steering member, 210 . . . vehicle member, 300 . . . knee

The invention claimed is:

1. A steering device that holds a steering member in such a manner that the steering member is movable between an advanced position where a driver is able to steer the steering member and a retracted position located closer to a front of a vehicle, the steering device comprising:
   a fixed member attached to a vehicle body;
   a movable member to which a steering shaft holding the steering member is rotatably attached; and
   an upper guide mechanism and a lower guide mechanism that linearly guide the movable member with respect to the fixed member, wherein
   an end on an advancing side of the upper guide mechanism is located further toward an advancing side than an end on an advancing side of the lower guide mechanism in an advancing and retracting direction of the movable member,
   the upper guide mechanism includes
      an upper fixed guide portion fixed to the fixed member, and
      an upper movable guide portion disposed on the upper fixed guide portion and fixed to the movable member,
   the lower guide mechanism includes
      a lower fixed guide portion fixed to the fixed member, and
      a lower movable guide portion disposed under the lower fixed guide portion and fixed to the movable member,
   a length of the upper movable guide portion is greater than a length of the lower movable guide portion, and
   when in the advanced position, an end on an advancing side of the upper movable guide portion is located further toward the advancing side than an end on an advancing side of the lower movable guide portion.

2. The steering device according to claim 1, wherein
   the upper guide mechanism includes upper rolling elements disposed between the upper fixed guide portion and the upper movable guide portion,
   the lower guide mechanism includes lower rolling elements disposed between the lower fixed guide portion and the lower movable guide portion, and
   the number of the upper rolling elements is greater than the number of the lower rolling elements.

3. The steering device according to claim 2, further comprising a trapezoidal cage that holds the upper rolling elements and the lower rolling elements together.

4. The steering device according to claim 1, wherein an end on an advancing side of an upper part of the movable member to which the upper guide mechanism is attached is located further toward the advancing side than an end on an advancing side of a lower part of the movable member to which the lower guide mechanism is attached.

\* \* \* \* \*